(12) United States Patent
Urimoto

(10) Patent No.: US 10,976,780 B2
(45) Date of Patent: Apr. 13, 2021

(54) ELECTRONIC APPARATUS

(71) Applicant: Panasonic Intellectual Property Management Co., Ltd., Osaka (JP)

(72) Inventor: Tetsuya Urimoto, Hyogo (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 16/147,810

(22) Filed: Sep. 30, 2018

(65) Prior Publication Data

US 2019/0033921 A1   Jan. 31, 2019

Related U.S. Application Data

(63) Continuation of application No. PCT/JP2017/012737, filed on Mar. 28, 2017.

(30) Foreign Application Priority Data

Apr. 5, 2016   (JP) .............................. JP2016-076053

(51) Int. Cl.
*G06F 1/16* (2006.01)

(52) U.S. Cl.
CPC ............ *G06F 1/1654* (2013.01); *G06F 1/166* (2013.01); *G06F 1/1616* (2013.01); *G06F 1/1656* (2013.01); *G06F 1/1681* (2013.01)

(58) Field of Classification Search
CPC ...... G06F 1/163; G06F 1/1656; G06F 1/1654; G06F 1/1681; G06F 1/1616; G06F 1/16; G06F 1/1626
See application file for complete search history.

(56) References Cited

U.S. PATENT DOCUMENTS 4,988,229 A * 1/1991 Ramsey, III ............ B42F 13/40
281/43
5,111,952 A * 5/1992 Stocchiero .......... H01M 2/1005
220/754
(Continued)

FOREIGN PATENT DOCUMENTS

JP    4-93316 U    8/1992
JP   10049302 A *  2/1998
(Continued)

OTHER PUBLICATIONS

JP 10049302—A Machine Translation (Year: 2019).*
(Continued)

*Primary Examiner* — Anthony Q Edwards
(74) *Attorney, Agent, or Firm* — Renner, Otto, Boisselle & Sklar, LLP

(57) ABSTRACT

The electronic apparatus includes a first unit including an operation unit, a second unit including a display unit, and a connecting portion, which is rotatably coupled to the first unit, and to which the second unit is detachably connected. The connecting portion includes a holding portion which is used by a user when the user holds the electronic apparatus. The holding portion is arranged to be positioned behind the first unit in the closed state where the second unit is closed with respect to the first unit, and positioned below a lower surface of the first unit in an open state where the second unit is opened with respect to the first unit.

12 Claims, 12 Drawing Sheets

(56) References Cited

U.S. PATENT DOCUMENTS

| | | | | |
|---|---|---|---|---|
| 6,208,504 | B1* | 3/2001 | Cho | G06F 1/1616 312/223.1 |
| 6,262,886 | B1* | 7/2001 | DiFonzo | G06F 1/1616 345/905 |
| 6,457,328 | B1* | 10/2002 | Tsai | A44C 5/0053 428/114 |
| 6,636,420 | B2* | 10/2003 | Nakano | G06F 1/1616 248/917 |
| 7,626,807 | B2* | 12/2009 | Hsu | G02F 1/133308 361/679.21 |
| 7,948,753 | B2* | 5/2011 | Wang | G06F 1/1616 220/318 |
| 8,072,744 | B2* | 12/2011 | Wang | G06F 1/166 248/371 |
| 8,104,655 | B2* | 1/2012 | Zhang | A45F 5/00 224/623 |
| 8,550,317 | B2* | 10/2013 | Hyseni | A45F 5/00 224/197 |
| 8,749,963 | B2* | 6/2014 | Staats | G06F 1/1632 248/121 |
| 9,250,652 | B2* | 2/2016 | London | G06F 1/163 |
| 9,372,507 | B2* | 6/2016 | Dekock | G06F 1/166 |
| 10,019,037 | B2* | 7/2018 | Lee | G06F 1/1656 |
| 10,554,798 | B2* | 2/2020 | Britt | H04M 1/18 |
| 10,606,311 | B2* | 3/2020 | Shindo | G06F 1/1637 |
| D894,889 | S* | 9/2020 | Feller | D14/251 |
| 2002/0044410 | A1* | 4/2002 | Nakano | G06F 1/1679 361/679.3 |
| 2004/0182667 | A1* | 9/2004 | Lin | A45C 13/26 190/115 |
| 2006/0034045 | A1* | 2/2006 | Wang | G06F 1/1616 361/679.55 |
| 2006/0104020 | A1* | 5/2006 | Fan | G06F 1/1656 361/679.55 |
| 2009/0186670 | A1* | 7/2009 | Rak | G06F 1/1647 455/575.3 |
| 2009/0244009 | A1* | 10/2009 | Staats | G06F 1/1643 345/168 |
| 2010/0046166 | A1* | 2/2010 | Tanaka | G06F 1/1616 361/679.59 |
| 2010/0053888 | A1* | 3/2010 | Nagamura | G06F 1/1656 361/679.59 |
| 2012/0044624 | A1* | 2/2012 | Hoffman | G06F 1/1628 361/679.21 |
| 2012/0257342 | A1 | 10/2012 | Shindo | |
| 2014/0211445 | A1 | 7/2014 | Hirai et al. | |
| 2015/0011269 | A1* | 1/2015 | Liu | H04M 1/0202 455/575.1 |
| 2015/0092333 | A1* | 4/2015 | Kim | G06F 1/1632 361/679.17 |
| 2016/0139636 | A1* | 5/2016 | Saito | G06F 1/1667 361/679.27 |

FOREIGN PATENT DOCUMENTS

| | | |
|---|---|---|
| JP | 10-336097 | 12/1998 |
| JP | 2000-10654 A | 1/2000 |
| JP | 2002-108506 A | 4/2002 |
| JP | 2004-328186 A | 11/2004 |
| JP | 2011-13738 A | 1/2011 |
| JP | 3171241 U | 10/2011 |
| JP | 2012-226733 A | 11/2012 |
| JP | 2014150108 A | 8/2014 |
| JP | 3198243 U | 6/2015 |

OTHER PUBLICATIONS

International Preliminary Report on Patentability (IPRP) for corresponding App. No. PCT/JP2017/012737, dated Oct. 9, 2018.
International Search Report for corresponding App. No. PCT/JP2017/012737, dated Apr. 25, 2017.
Japanese Office Action for corresponding Application No. 2018-510552 dated Jan. 26, 2021, with a English translation.

* cited by examiner

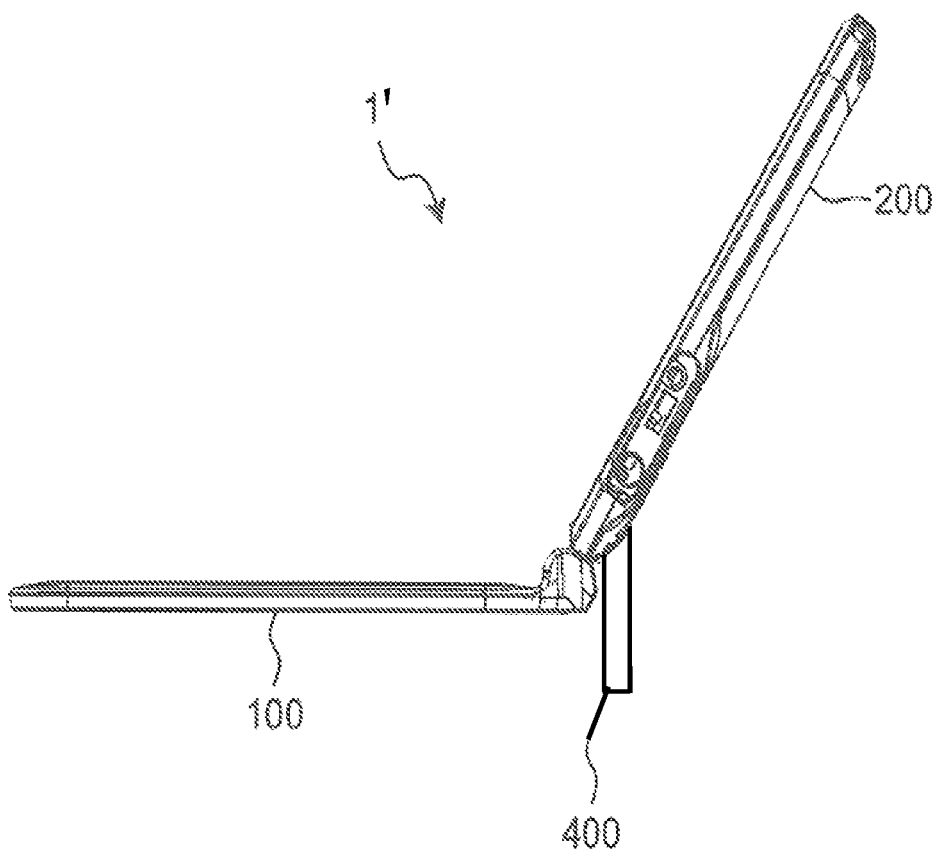

ELECTRONIC APPARATUS

CROSS-REFERENCE TO RELATED APPLICATIONS

This is a continuation application of International Application No. PCT/JP2017/012737, with an international filing date of Mar. 28, 2017, which claims priority of Japanese Patent Application No.: 2016-076053 filed on Apr. 5, 2016, the content of which is incorporated herein by reference.

BACKGROUND

1. Technical Field

The present disclosure relates to an electronic apparatus having a first unit and a second unit.

2. Related Art

JP 2011-13738 A discloses an electronic apparatus including a first unit having an operation unit and a second unit rotatably coupled to the first unit, the second unit having a display unit. This electronic apparatus includes a belt member that can be pulled out in a direction perpendicular to the bottom surface when a user holds the electronic apparatus, a bottom surface of the first unit.

In the electronic apparatus of JP 2011-13738 A, since the belt member can be pulled out only in a direction perpendicular to the bottom surface, the mode of holding is limited. It is conceivable to provide another belt member at another portion of the electronic apparatus, but in this case, the number of components increases.

The present disclosure provides, regarding the electronic apparatus having a first unit and a second unit, a structure in which the user can appropriately holding the electronic apparatus with a single holding portion regardless of whether the electronic apparatus is in an open state or a closed state.

SUMMARY

The electronic apparatus according to a first aspect of the present disclosure includes:
 a first unit including an operation unit;
 a second unit including a display unit; and
 a connecting portion, which is rotatably coupled to the first unit, and to which the second unit is detachably connected.

The connecting portion includes a holding portion which is used by a user when the user holds the electronic apparatus.

The holding portion is arranged to be positioned behind the first unit in the closed state where the second unit is closed with respect to the first unit, and positioned below a lower surface of the first unit in an open state where the second unit is opened with respect to the first unit.

The electronic apparatus according to a second aspect of the present disclosure includes:
 a first unit including an operation unit; and
 a second unit rotatably coupled to the first unit and includes a display unit.

The second unit includes a holding portion in a side portion connected to the first unit, the holding portion being used by a user when the user holds the electronic apparatus.

The holding portion is arranged to be positioned behind the first unit in the closed state where the second unit is closed with respect to the first unit, and positioned below a lower surface of the first unit in an open state where the second unit is opened with respect to the first unit.

According to the present disclosure, regarding an electronic apparatus having a first unit and a second unit, the user can appropriately hold the electronic apparatus with a single holding portion regardless of whether the electronic apparatus is in an open state or a closed state.

BRIEF DESCRIPTION OF DRAWINGS

FIG. 11 is a side view showing the electronic apparatus according to another embodiment in the open state and the handle pulled-out state.

DETAILED DESCRIPTION

In the following, embodiments will be described in detail with reference to the drawings as appropriate. However, a detailed description more than necessary may be omitted. For example, a detailed description of already well-known matters and an overlapping description for substantially the same configuration may be omitted. This is to avoid the unnecessary redundancy of the following description and to facilitate understanding by those skilled in the art.

It should be noted that the inventor provides the accompanying drawings and the following description for a person skilled in the art to fully understand the present disclosure. Thus, the drawings and the description are not intended to limit the subject matter defined in the claims.

First Embodiment

In the following, the first embodiment will be described with reference to the drawings.

[1. Configuration]

[1-1. Overview of Electronic Apparatus]

Figure 1:
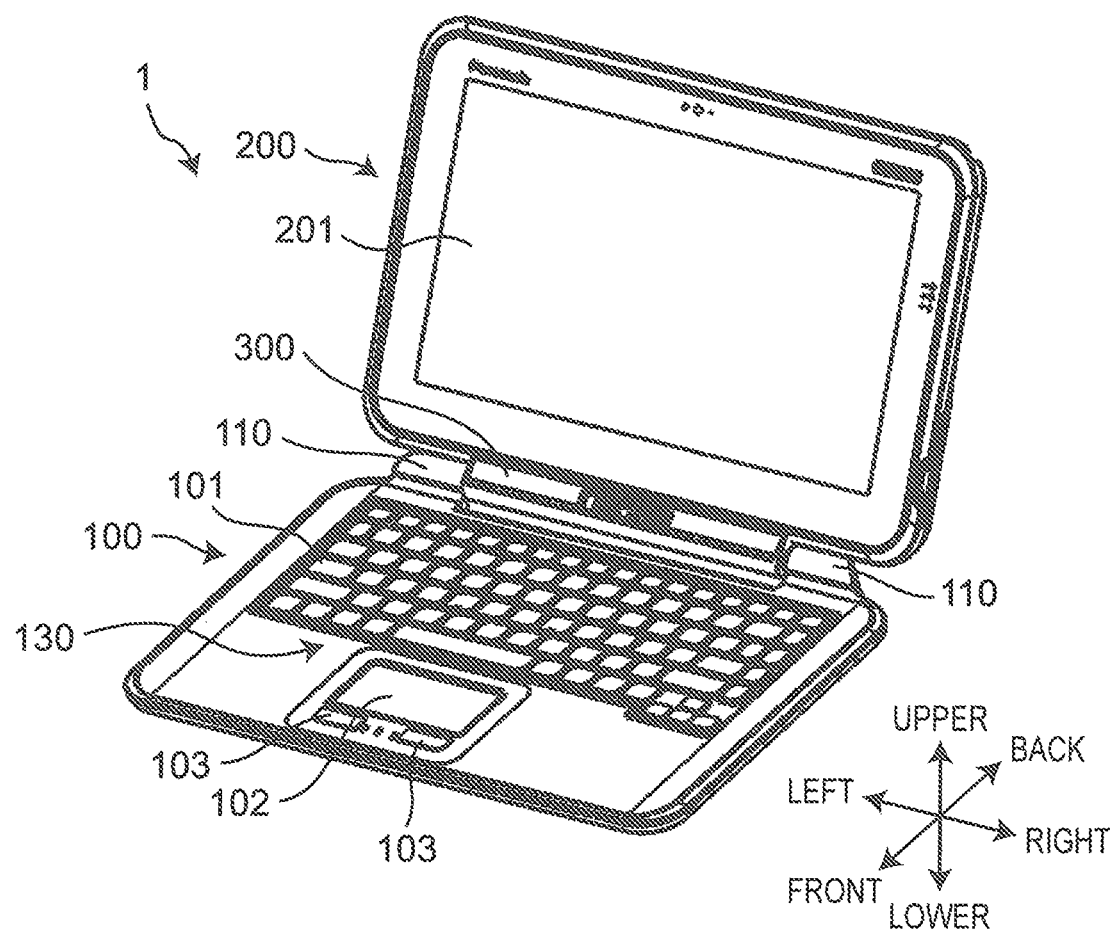
FIG. 1 is a perspective view showing an appearance of a front side of an electronic apparatus according to the present embodiment in an open state.
Figure 2:
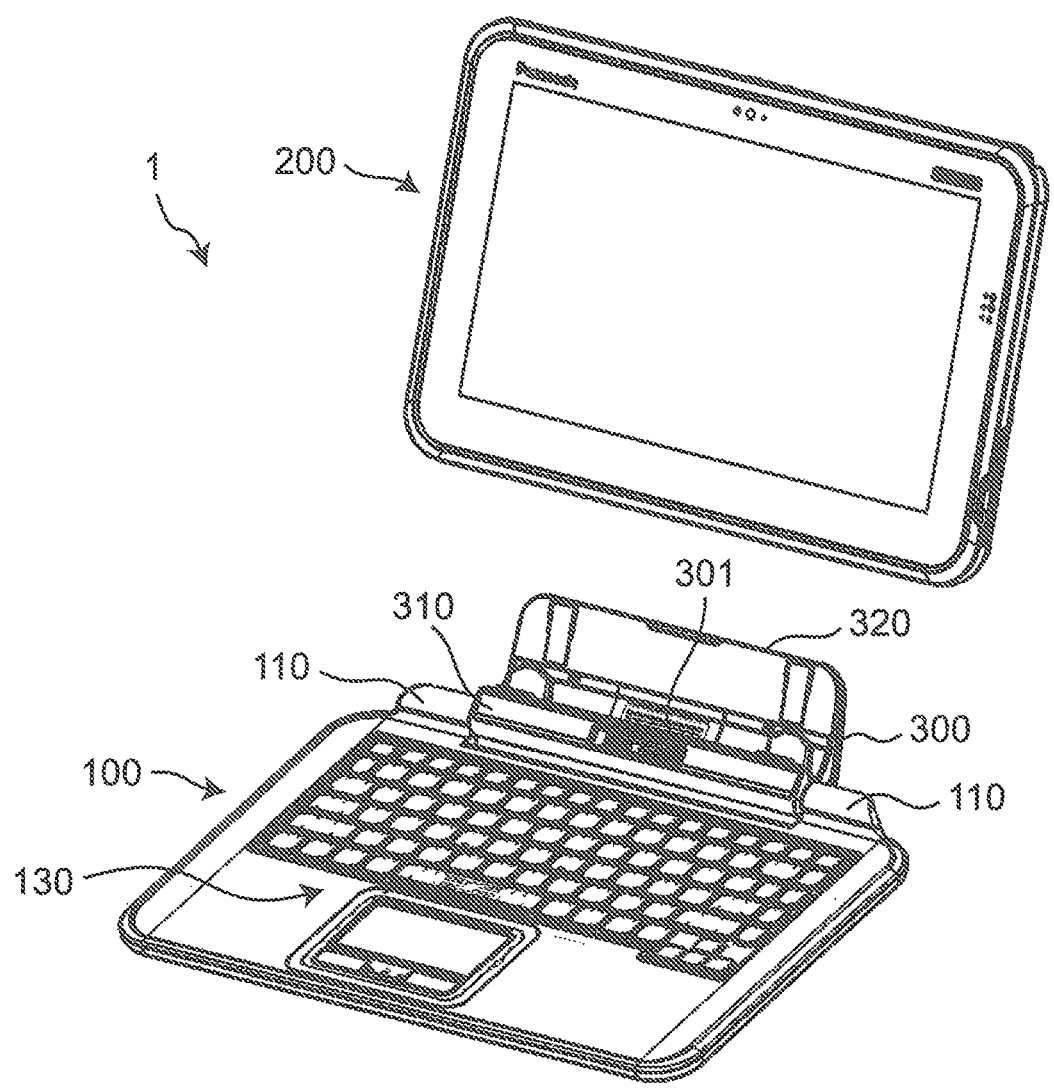
FIG. 2 is a perspective view of a front side of the electronic apparatus according to the present embodiment with a second unit removed.

FIG. 1 is a perspective view showing an appearance of a front side of an electronic apparatus according to the present embodiment in an open state. FIG. 2 is a perspective view of a front side of the electronic apparatus according to the present embodiment with a second unit removed.

As shown in FIGS. 1 and 2, an electronic apparatus 1 includes a first unit 100 including an operation unit 130, a second unit 200 including a display unit 201, and a holder 300 which is rotatably coupled to the first unit 100 and to which the second unit 200 is detachably connected. The electronic apparatus 1 is configured as a so-called detachable type computer. It should be noted that the definition of directions shown in FIG. 1 is for convenience of explanation, and is described based on a state where the user uses the notebook-type computer in a general state as shown in FIG. 1.

The first unit 100 is an operation unit for accepting the user's input operation. The housing of the first unit 100 is made of metal such as magnesium allay or resin. As the operation unit 130, the first unit 100 includes a keyboard 101, a touch pad 102, a plurality of operation buttons 103, and the like for the user to perform input processing. In addition, the first unit 100 has an arithmetic processing unit that performs processing or the like of outputting signals corresponding to the operations on the keyboard 101, the touch pad 102, and the plurality of operation buttons 103.

The second unit 200 is a tablet-type computer. The housing of the second unit 200 is made of metal such as magnesium alloy or resin. The display unit 201 includes, for example, a liquid crystal display panel. The display unit 201 is a touch panel capable of accepting the user's touch operation. The second unit 200 has a central processing unit (CPU), a volatile storage device (RAM), a nonvolatile storage device (RCM, SSD, and the like), a battery, and the like. In the nonvolatile storage device (ROM, SSD, and the like), an operating system (OS), various application programs, various types of data, and the like are stored. The central processing unit (CPU) achieves various functions by reading the OS, application programs, various types of data to execute arithmetic processing.

The holder 300 can accommodate the lower side of the second unit 200. The holder 300 is rotatably supported with respect to the first unit 100 with a hinge portion 110 of the first unit 100. The holder 300 is configured so that the second unit 200 is detachable.

The holder 300 is provided with a connector 301 to be connected to a connector (not shown) of the second unit 200 with the lower side portion of the second unit 200 accommodated. The connector 301 of the holder 300 is electrically signal-connected to the arithmetic processing unit of the first unit 100. Various signals and electric power can be exchanged between the first unit 100 and the second unit 200 through these connectors. For example, signals output from the input unit such as the keyboard 101, the touch pad 102, and the plurality of operation buttons 103, and the like of the first unit 100 can be output to the second unit 200. The second unit 200 can receive these signals and perform control based on the received signals. Therefore, according to the electronic apparatus 1, the first unit 100 can be used as a notebook-type computer with the second unit 200 attached. In addition, the second unit 200 alone can be used as a tablet-type computer.

[1-2. Structure of Holder]

As shown in FIG. 2, the holder 300 is coupled to the first unit 100 to be rotatable around a rotation axis parallel to the left and right direction of the first unit 100 with the left and right hinge portions 110 provided on the back side portions of the first unit 100.

The holder 300 includes a holder body portion 310 and a back surface supporting portion 320. The holder body portion 310 is arranged between the left and right hinge portions 110, and is coupled to the left and right hinge portions 110 at the left and right end portions. The back surface supporting portion 320 is provided on the back side of the holder body portion 310, has a plate shape, and supports the second unit 200 connected on its back surface side.

Figure 3A:
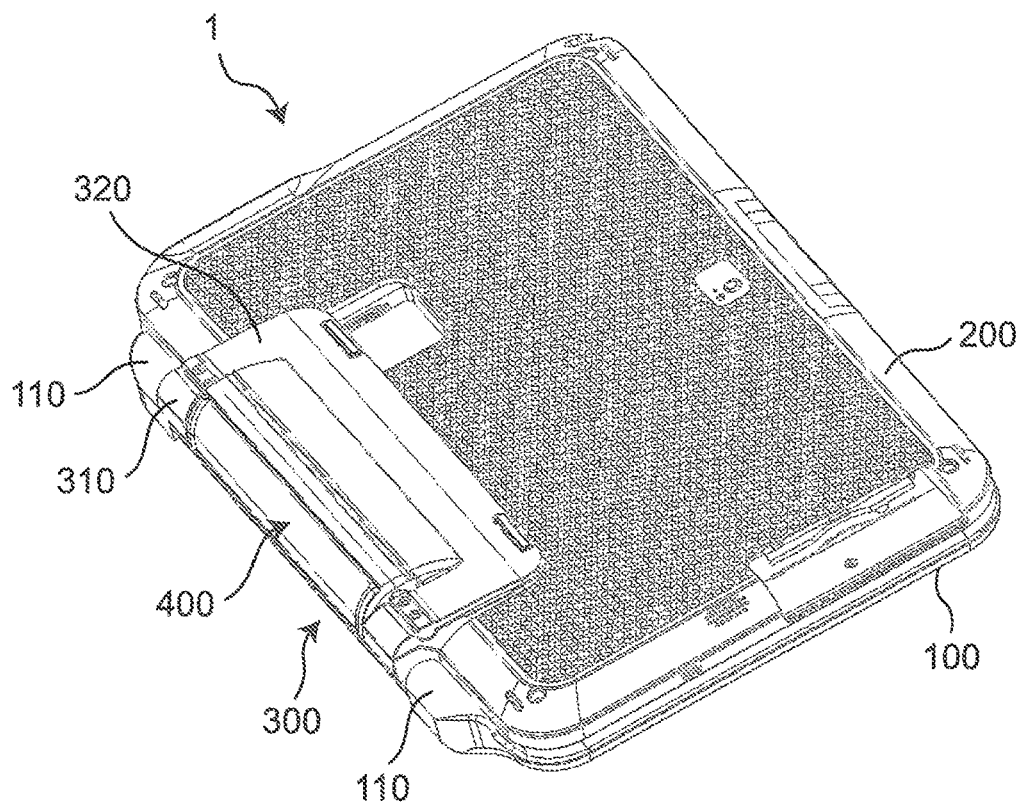
FIG. 3A is a perspective view showing the electronic apparatus according to the present embodiment in a closed state and a handle stored state.
Figure 3B:
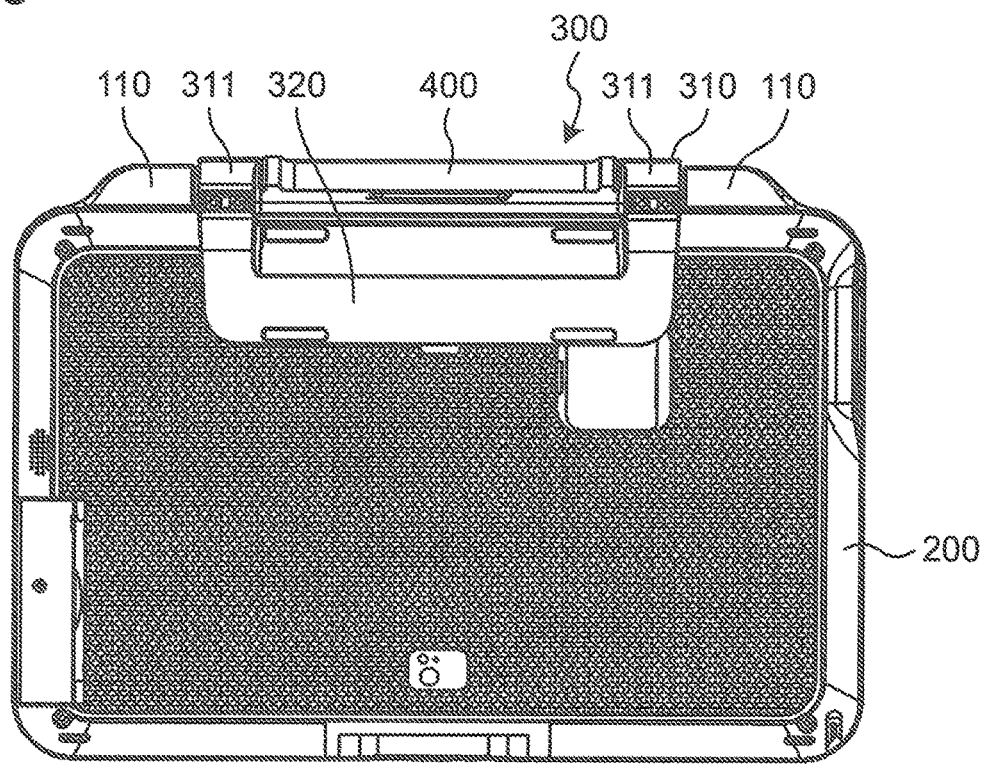
FIG. 3B is a top view showing the electronic apparatus according to the present embodiment in the closed state and the handle stored state.
Figure 4A:
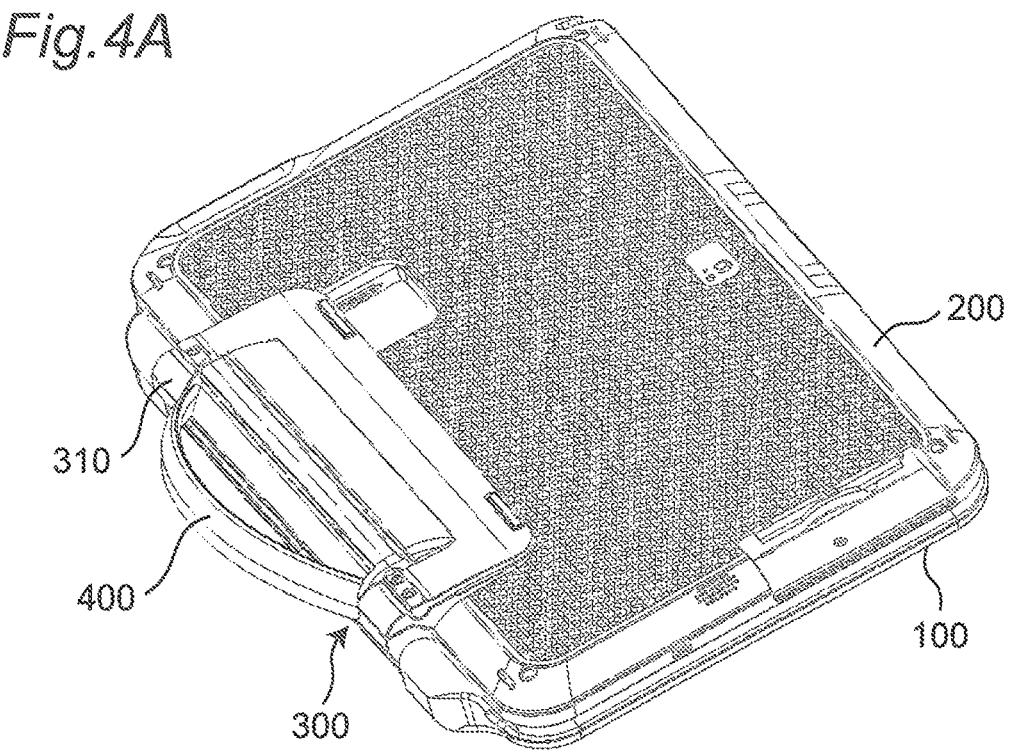
FIG. 4A is a perspective view showing the electronic apparatus according to the present embodiment in the closed state and a handle pulled-out state.
Figure 4B:
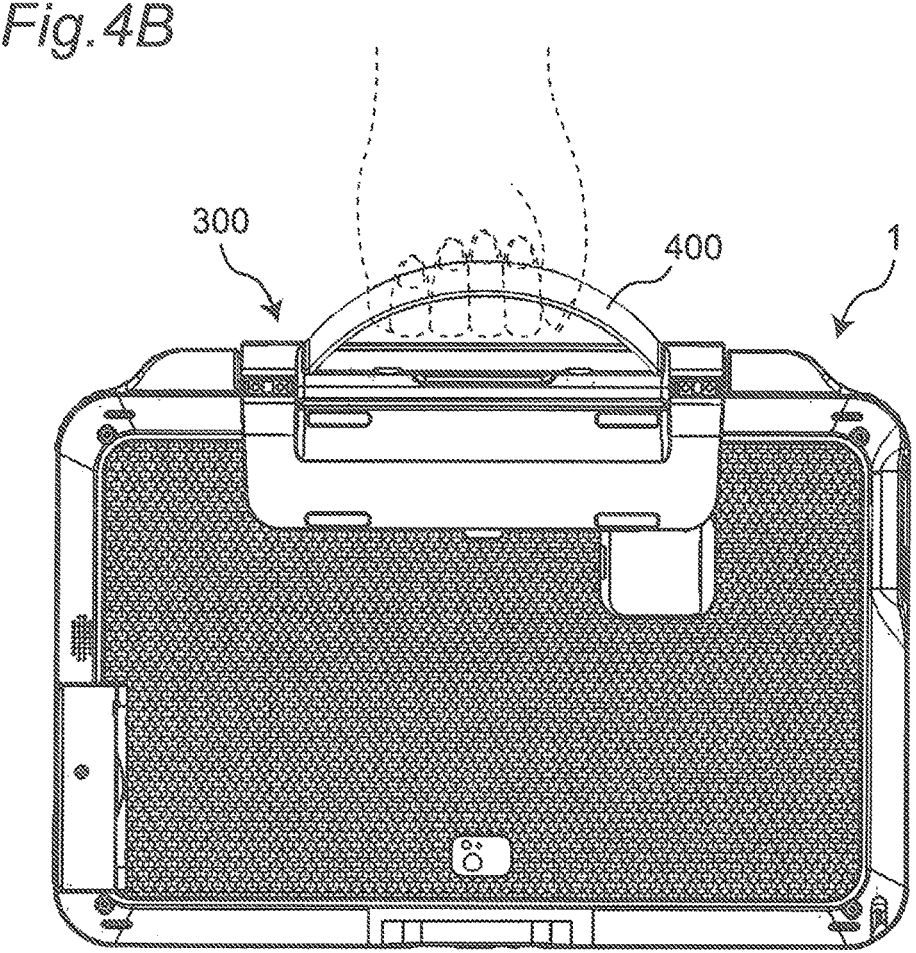
FIG. 4B is a top view showing the electronic apparatus according to the present embodiment in the closed state and the handle pulled-out state.

FIG. 3A is a perspective view showing the electronic apparatus 1 according to the present embodiment in a closed state and a handle stored state. FIG. 3B is a top view showing the electronic apparatus 1 according to the present embodiment in the closed state and the handle stored state. FIG. 4A is a perspective view showing the electronic apparatus 1 according to the present embodiment in the closed state and the handle pulled-out state. FIG. 4B is a top view showing the electronic apparatus 1 according to the present embodiment in the closed state and the handle pulled-out state.

As shown in these figures, the holder 300 is provided with a handle 400. As shown in FIGS. 3A and 3B, the handle 400 is arranged at a position of a side portion (side surface) on the back side of the electronic apparatus 1 when the electronic apparatus 1 is in the closed state.

The handle 400 is supported, at both end portions in the longitudinal direction, by the holder body portion 310 so as to be slidable within a predetermined range in the longitudinal direction, and can take the stored state shown in FIGS.

3A and 3B and the pulled-out state shown in FIGS. 4A and 4B. It should be noted that the structure for sliding will be described below.

More specifically, as shown in FIG. 4A, when the handle 400 is pulled out in the closed state of the electronic apparatus 1, the handle 400 is configured to be pulled out toward the back of the back side portion of the first unit 100. Pulling out the handle 400 in this way and arranging the electronic apparatus 1 so that the handle 400 side is on the upper side as shown in FIG. 4B allows the handle 400 to be used as the carrying handle when the electronic apparatus 1 is moved. The electronic apparatus 1 in the closed state is assumed to be in a state in which the electronic apparatus 1 is not used. In such a state, a situation where the electronic apparatus 1 is held can be considered to be a situation where the electronic apparatus 1 is to be carried. In this embodiment, as described above, the handle 400 is configured to be pulled out to the back side of the back side portion of the first unit 100. Therefore, it allows the electronic apparatus 1 to be held and carried in a general briefcase-like manner.

Figure 5A:
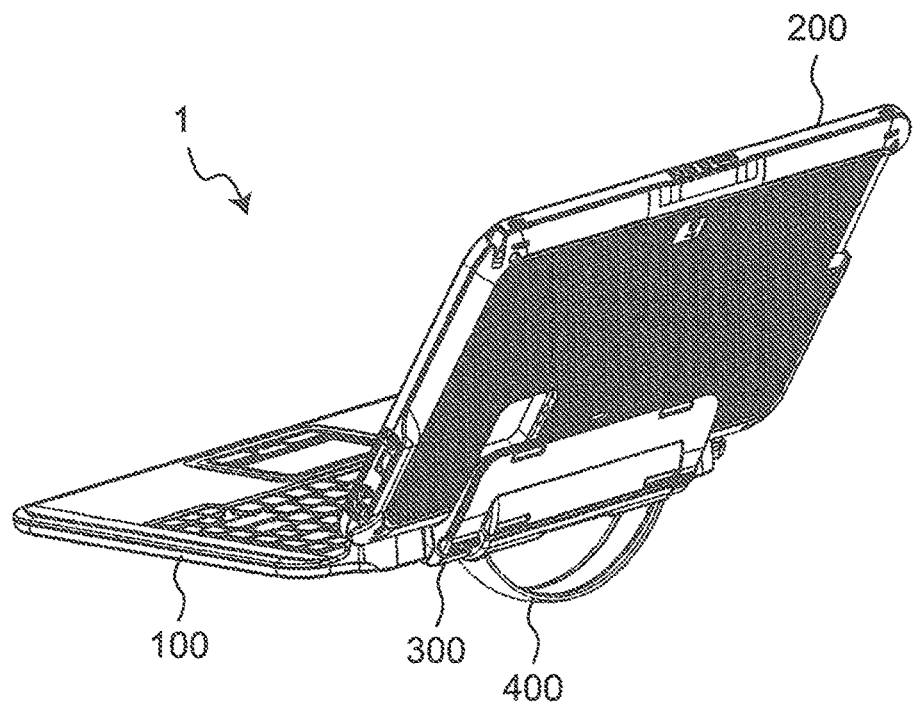
FIG. 5A is a perspective view showing the electronic apparatus according to the present embodiment in the open state and the handle pulled-out state.
Figure 5B:
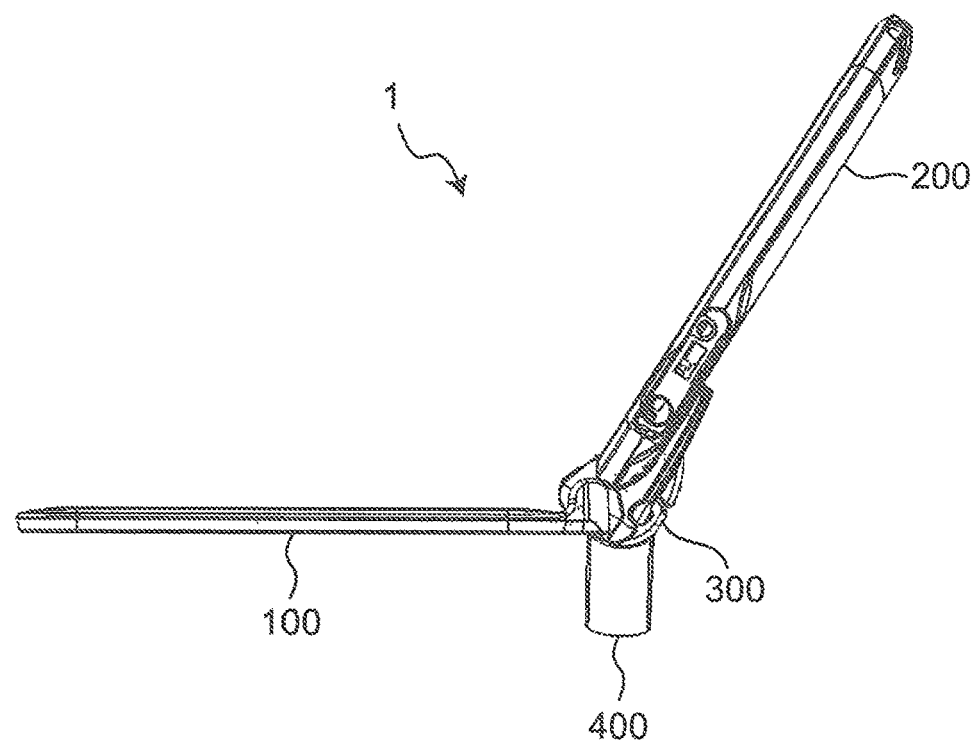
FIG. 5B is a side view showing the electronic apparatus according to the present embodiment in the open state and the handle pulled-out state.
Figure 5C:
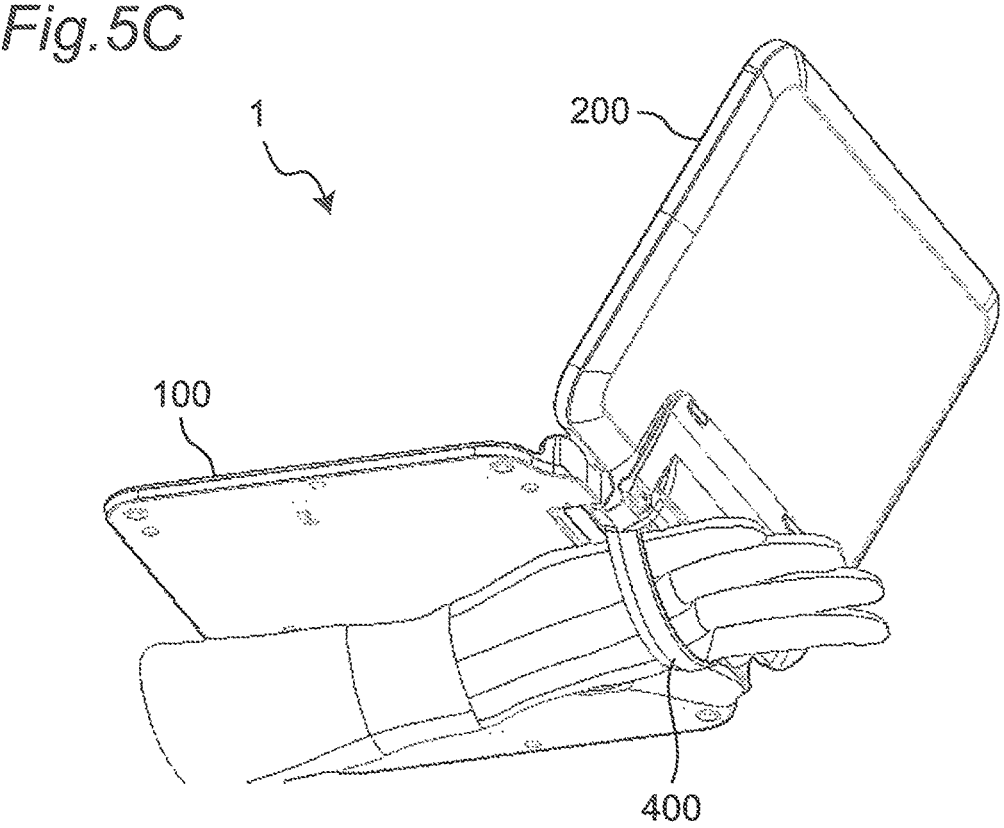
FIG. 5C is a perspective view showing the electronic apparatus according to the present embodiment held in the open state and the handle pulled-out state.

FIG. 5A is a perspective view showing the electronic apparatus 1 according to the present embodiment in the open state and the handle pulled-out state. FIG. 5B is a side view showing the electronic apparatus 1 according to the present embodiment in the open state and the handle pulled-out state. FIG. 5C is a perspective view showing the electronic apparatus 1 according to the present embodiment held in the open state and the handle pulled-out state.

As shown in FIGS. 5A and 5B, in the open state of the electronic apparatus 1, the holder 300 rotates together with the second unit 200, which causes the handle 400 to be pulled out in a direction substantially perpendicular to the lower surface of the first unit 100. When the electronic apparatus 1 is in the open state, the electronic apparatus 1 is assumed to be in a state in which the electronic apparatus 1 is used. In such a state, when the electronic apparatus 1 is in the open state and the handle 400 is pulled out, as shown in FIG. 5C, inserting a hand between the handle 400 and the lower surface of the first unit 100 allows the electronic apparatus 1 to be stably held even without being placed on a desk or the like.

Thus, according to the present embodiment, in an electronic apparatus having the first unit 100 and the second unit 200, the electronic apparatus 1 can be appropriately held with one handle 400 regardless of whether the electronic apparatus 1 is in an open state or a closed state.

[1-3. Structure of Handle]

The structure of the handle 400 and a structure for installing the handle 400 will be described.

Figure 6A:
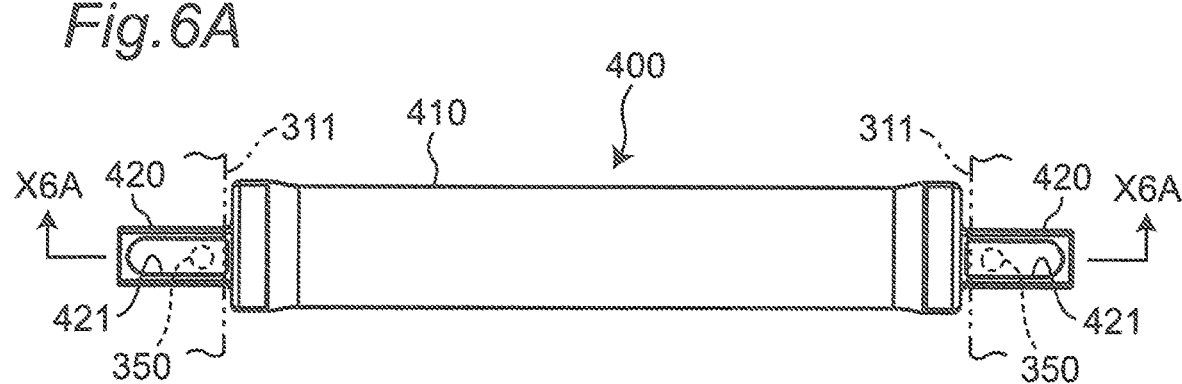
FIG. 6A is a plan view of the handle of the electronic apparatus according to the present embodiment.
Figure 6B:
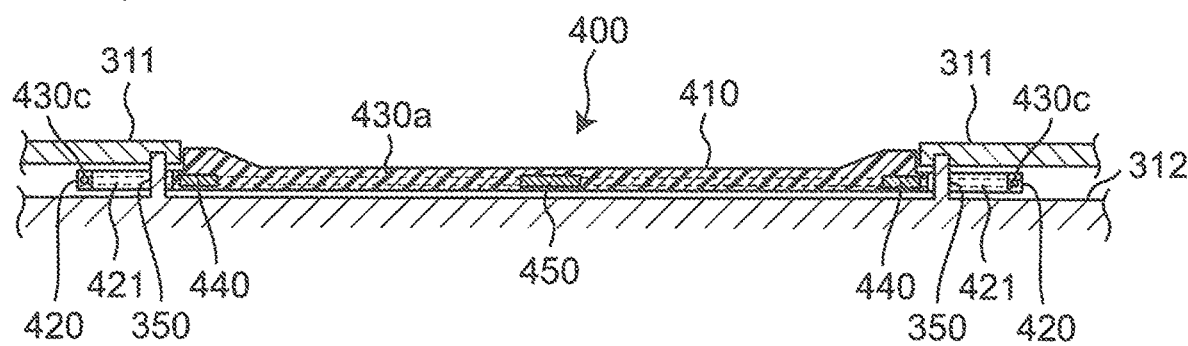
FIG. 6B is a cross-sectional view showing an installed state of the handle of the electronic apparatus according to the present embodiment.
Figure 6C:
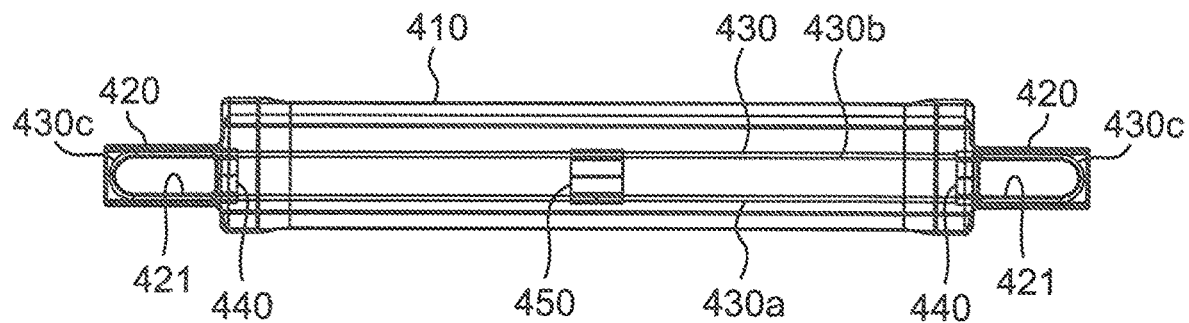
FIG. 6C is a plan view showing the handle of the electronic apparatus according to the present embodiment in a see-through state.

FIG. 6A is a plan view of the handle 400 of the electronic apparatus 1 according to the present embodiment. FIG. 6B is a cross-sectional view showing an installed state of the handle 400 of the electronic apparatus 1 according to the present embodiment. FIG. 6C is a plan view showing the handle 400 of the electronic apparatus 1 according to the present embodiment in a see-through state. It should be noted that FIG. 6B shows a cross section taken along line X6A in FIG. 6A.

As shown in these figures, the handle 400 includes a handle body portion 410 and an installation portion 420.

The handle body portion 410 is formed in a strap-like shape with resin having bending flexibility.

The installation portion 420 is formed to protrude in the longitudinal direction from the longitudinal end portion of the handle body portion 410, and has a long hole-shaped pin insertion hole 421 extending in the longitudinal direction. In the pin insertion hole 421, a pin 350 for installing the handle 400 to the holder 300 is inserted. The pin 350 is formed to protrude in a pin shape from a holder body member 312 of the holder 300, and is inserted into a handle end cover member 311 on the end side. The length of the pin insertion hole 421 in the longitudinal direction is larger than the diameter of the pin 350. Therefore, both sides in the longitudinal direction of the handle 400 is slidable in the longitudinal direction within the range of the length of the pin insertion hole 421, thereby capable of taking a state where the handle 400 is stored and a state where the handle 400 is pulled out.

A reinforcing core member 430 having a flat loop shape is arranged inside the handle 400. The reinforcing core member 430 is configured with a single metal wire which is bent into a flat loop shape. Specifically, the reinforcing core member 430 includes straight portions 430a and 430b extending in the longitudinal direction of the handle 400 in the handle body portion 410 and the installation portion 420, and an arcuate portion 430c which has circular-arc-shape and connects the straight portions 430a and 430b inside the end side of the installation portion 420. More specifically, the reinforcing core member 430 is formed with one metal wire of which both end sides is arranged near the center in the longitudinal direction of the handle 400. The metal wire is bent into a flat loop shape, and both end portions of the metal wire is bonded with a crimping metal plate 450 (in the example of FIG. 6C, both end portions of the metal wire are connected with the crimping metal plate 450 on the straight portion 430a side). The crimping metal plate 450 also relatively immovably fixes the straight portion 430a and the straight portion 430b to each other near the center in the longitudinal direction of the handle 400. Thus, the crimping metal plate 450 serves to keep the distance between the two straight portions 430a and 430b near the center in the longitudinal direction of the handle body portion 410, constant. In addition, the straight portion 430a and the straight portion 430b are relatively immovably fixed to each other near the longitudinal end portions of the handle body portion 410 via a crimping metal plate 440. Thus, the crimping metal plates 440 serve to keep the distance between the two straight portions 430a and 430b near both the end portions in the longitudinal direction of the handle body portion 410, constant.

The metal reinforcing core member 430 is provided to increase a longitudinal tensile strength of the resin handle 400. The handle 400 is assumed to be used as a carrying handle as described above. In this case, the load of the electronic apparatus 1 is applied to the handle 400. Therefore, the metal reinforcing core member 430 is provided inside the handle 400, thereby improving the load capacity performance of the handle 400.

[1-4. Stand Structure]

Figure 7A:
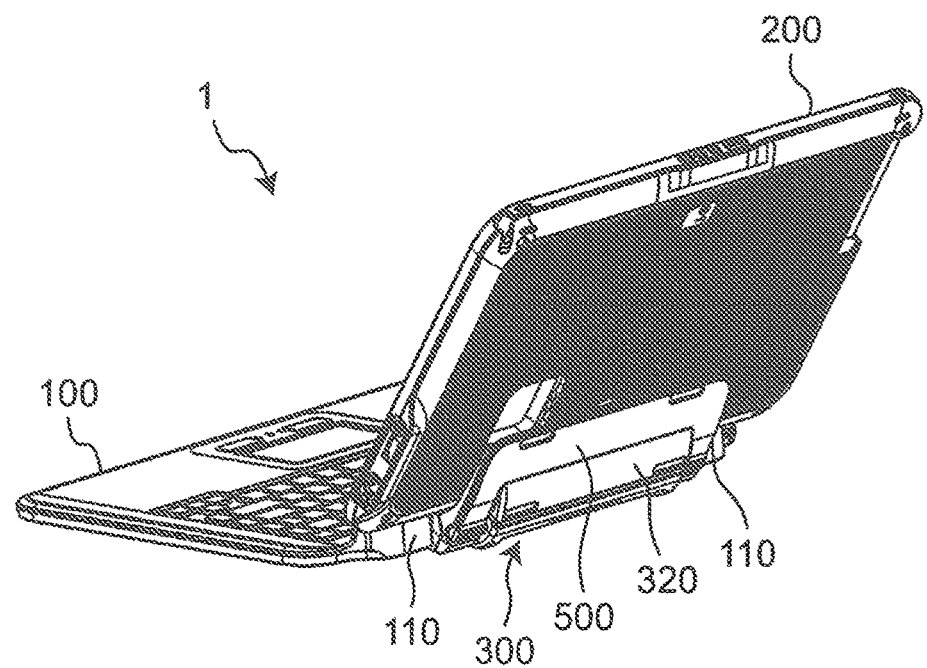
FIG. 7A is a perspective view showing the electronic apparatus according to the present embodiment in the open state and the handle stored state.
Figure 7B:
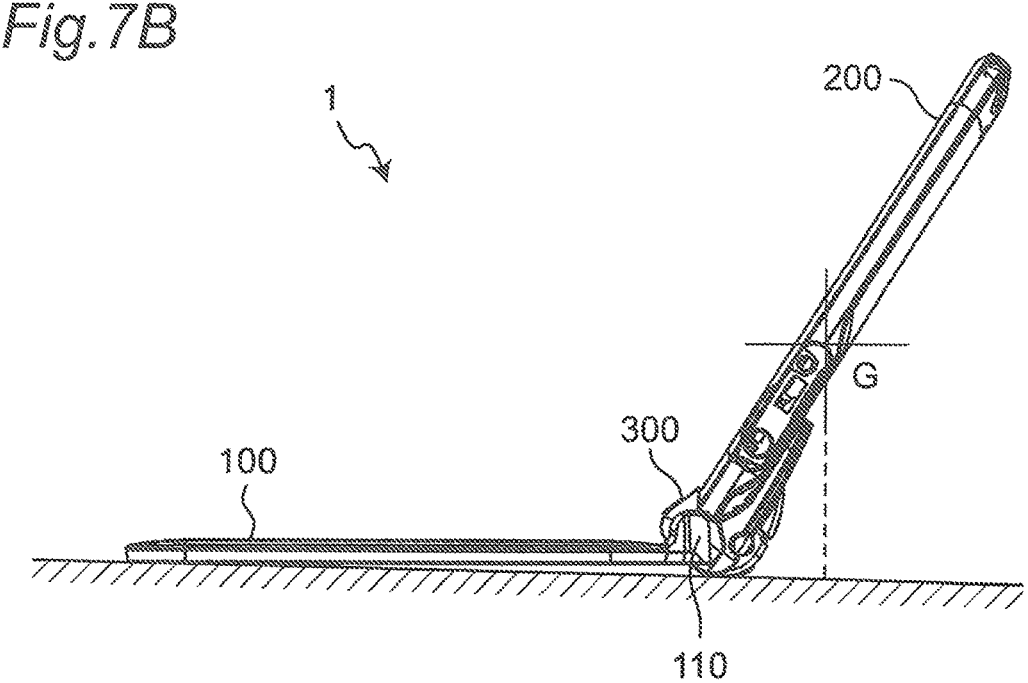
FIG. 7B is a side view showing the electronic apparatus according to the present embodiment in the open state and the handle stored state.

FIG. 7A is a perspective view showing the electronic apparatus 1 according to the present embodiment in the open state and the handle stored state. FIG. 7B is a side view showing the electronic apparatus 1 according to the present embodiment in the open state and the handle stored state.

As in this embodiment, when the second unit 200 is configured to be attachable to and detachable from the first unit 100, and main components such as a battery and a CPU are in a tablet provided on the second unit 200 side, the second unit 200 is relatively heavier than the first unit 100. Therefore, as shown in FIGS. 7A and 7B, when the first unit 100 is opened with respect to the second unit 200 and the electronic apparatus 1 is set into the open state, the center of gravity G of the electronic apparatus 1 is behind the first unit 100, and as a result, the electronic apparatus 1 may fall to the back side while the electronic apparatus 1 is placed on a desk or the like to be used.

Figure 8A:
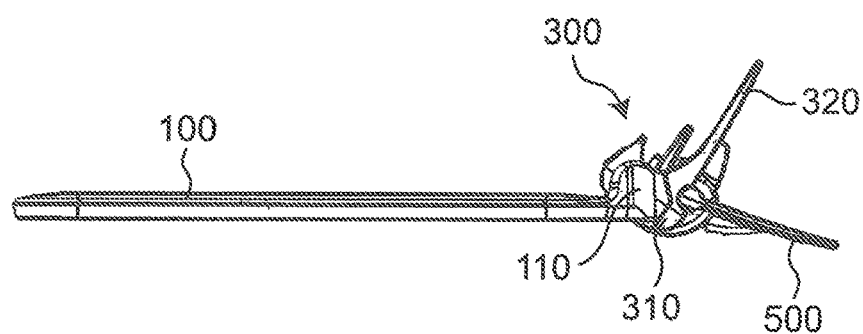
FIG. 8A is a perspective view showing the electronic apparatus according to the present embodiment in a state where a stand of a holder is opened without the second unit being connected.
Figure 8B:
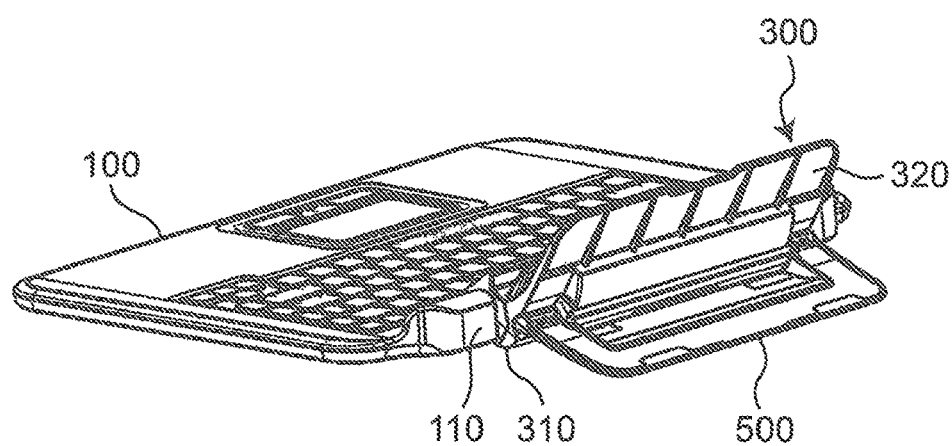
FIG. 8B is a side view showing the electronic apparatus according to the present embodiment in a state where the stand of the holder is opened without the second unit being connected.
Figure 9A:
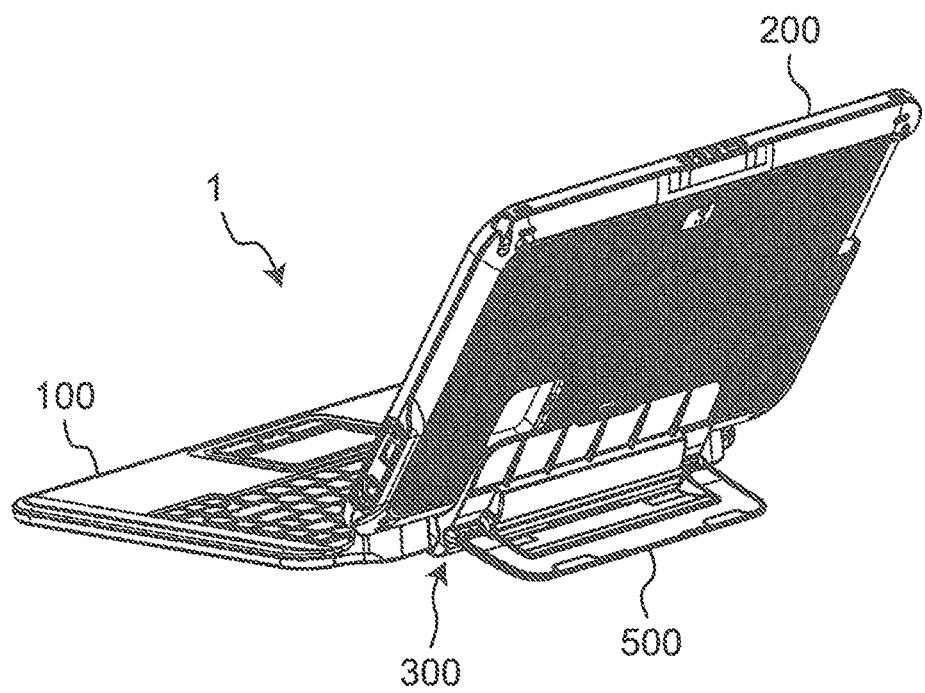
FIG. 9A is a perspective view showing the electronic apparatus according to the present embodiment in a state where the stand of the holder is opened with the second unit being connected.
Figure 9B:
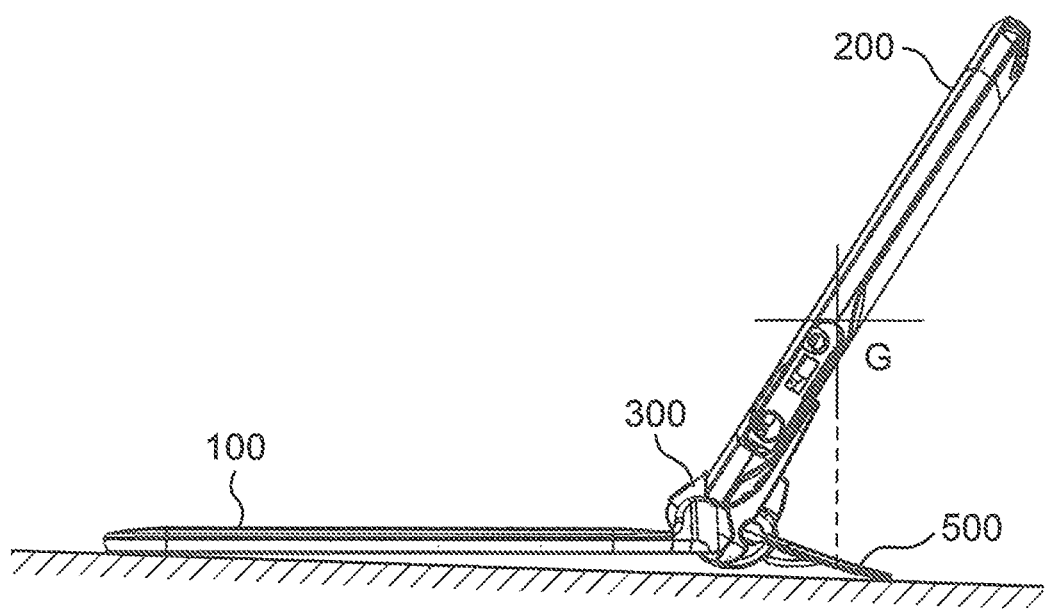
FIG. 9B is a side view showing the electronic apparatus according to the present embodiment in a state where the stand of the holder is opened with the second unit being connected.

To cope with this, in the electronic apparatus 1 of the present embodiment, as shown in FIGS. 8A, 8B, 9A, and 9B, a plate-shaped stand 500 is provided on the back side of the back surface supporting portion 320 of the holder 300. FIG. 8A is a perspective view showing the electronic apparatus 1 according to the present embodiment in a state where the stand 500 of the holder 300 is opened without the second unit 200 being connected. FIG. 8B is a side view showing the electronic apparatus 1 according to the present embodiment in a state where the stand 500 of the holder 300 is opened without the second unit 200 being connected. FIG. 9A is a perspective view showing the electronic apparatus 1 according to the present embodiment in a state where the stand 500 of the holder 300 is opened with the second unit 200 being connected. FIG. 9B is a side view showing the electronic apparatus 1 according to the present embodiment in a state where the stand 500 of the holder 300 is opened with the second unit 200 being connected.

The stand 500 can be rotated between the closed state shown in FIGS. 7A and 7B and the open state shown in FIGS. 9A and 9B around a rotation axis parallel to the rotation axis of the hinge portion 110. In addition, the holder 300 is provided with an open/close state holding portion (not shown) for holding the stand 500 in each of the open state and the closed state. The configuration of the open/close state holding portion may be any configuration as long as it can hold the open/close state. As shown in FIG. 9A, the stand 500 extends backward from the center of gravity G of the electronic apparatus 1 in the open state in which the second unit 200 is opened with respect to the first unit 100. Thus, setting the stand 500 in the open state prevents the electronic apparatus 1 from falling down to the back side, even when the second unit 200 of the electronic apparatus 1 is operated in a state where the second unit 200 is opened with respect to the first unit 100.

In addition, even if the electronic apparatus 1 falls down with the stand 500 open, the stand 500 rotates in the closing direction, whereby concentration of impact on the stand 500 or the holder 300 is prevented, and therefore, damage to the stand 500 and the holder 300 are prevented.

[1-5. Display Unit Protection Structure]

As in the present embodiment, in the case of a structure in which the first unit 100 and the second unit 200 are rotatable around the hinge portion 110, and the display unit 201 of the second unit 200 faces the keyboard 101 of the first unit 100 in the closed state, generally, a certain space is secured between the display unit 201 and the keyboard 101, and the display unit 201 is configured not abut on the keyboard 101, that is, the display unit 201 is configured not to be damaged. Conventionally, such a structure has been achieved by rubber members or the like being attached to the surface, in the first unit 100 or the second unit 200, facing the other unit. However, in the case of this configuration, there have been problems that the cost of the electronic apparatus 1 increases by the amount of the rubber members or the like, the number of installation steps increases, and the like.

Figure 10A:
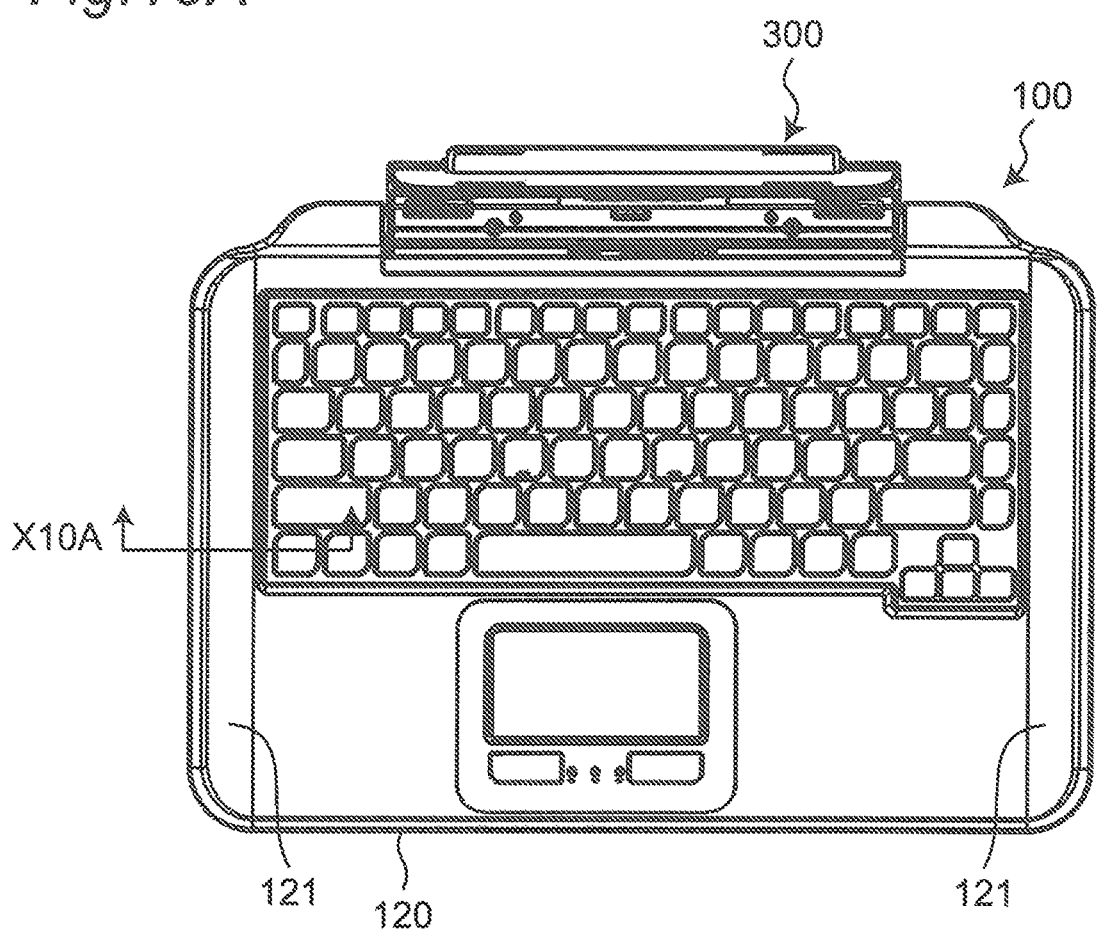
FIG. 10A is a top view of the first unit of the electronic apparatus according to the present embodiment.
Figure 10B:
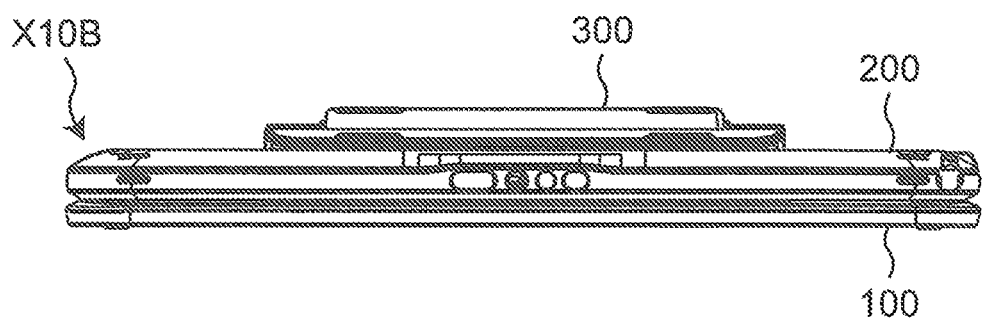
FIG. 10B is a front view showing the electronic apparatus according to the present embodiment in the closed state.
Figure 10C:
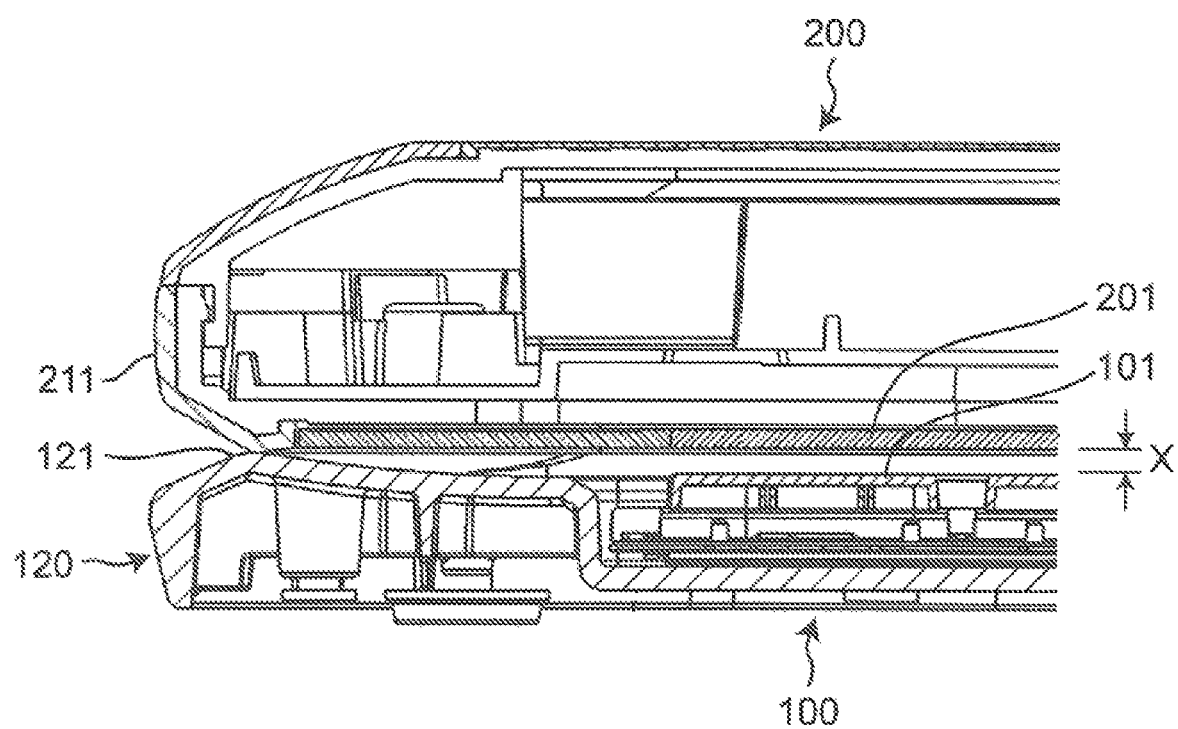
FIG. 10C is a cross-sectional view taken along line X10A in FIG. 10A (the second unit is shown in a connected state)

To cope with this, the electronic apparatus 1 of the present embodiment has a structure as shown in FIGS. 10A, 10B, and 10C. FIG. 10A is a top view of the first unit 100 of the electronic apparatus 1 according to the present embodiment. FIG. 10B is a front view showing the electronic apparatus 1 according to the present embodiment in the closed state.

FIG. 10C is a cross-sectional view taken along line X10A in FIG. 10A (the second unit 200 is shown in a connected state).

As shown in FIG. 10A, protruding portions 121 protruding upward are provided on upper surfaces of left and right side portions of an upper housing 120 of the first unit 100. Then, as shown in FIG. 10B, with the second unit 200 closed with respect to the first unit 100, as shown in FIG. 10C, this protruding portion 121 is configured to abut on a frame-shaped case 211 surrounding the display unit 201 in the second unit 200 with a gap X formed between the keyboard 101 and the display unit 201. It should be noted that the frame-shaped case 211 is made of resin or the like. Therefore, when the protruding portion 121 of the first unit 100 formed of a magnesium alloy and the frame-shaped case 211 of the second unit 200 abut on each other, problems such as scratches hardly occur in either member.

[2. Effects and the Like]

The electronic apparatus 1 of the present embodiment includes:

a first unit 100 including an operation unit 130;

a second unit 200 including a display unit 201; and a holder 300 (connecting portion) which is rotatably coupled to the first unit 100, and to which the second unit 200 is detachably connected.

The holder 300 (connecting portion) includes a handle 400 (holding portion) which is used by the user when the user holds the apparatus.

The handle 400 (holding portion) is arranged to be positioned behind the first unit 100 in the closed state where the second unit 200 is closed with respect to the first unit 100, and positioned below the lower surface of the first unit 100 in the open state where the second unit 200 is opened with respect to the first unit 100.

Thus, regardless of whether the electronic apparatus 1 is in the open state or the closed state, the electronic apparatus 1 can be held with the common handle 400.

In the present embodiment, the handle 400 (holding portion) has a strap-like shape and is configured to be capable of being stored in the holder 300 (connecting portion).

Thus, the handle 400 can be stored in the holder 300 when not in use. Therefore, the handle 400 is prevented from becoming an obstacle when the handle 400 is not used.

In the present embodiment, the metal reinforcing core member 430 is arranged inside the handle 400.

Thus, the tensile strength of the handle 400 having the strap-like shape can be improved. Therefore, the handle 400 can be appropriately used as a carrying handle or the like.

In the present embodiment, the reinforcing core member 430 is a metal wire.

Thus, the reinforcing core member 430 can be easily formed by a metal wire.

OTHER EMBODIMENTS

As described above, the first embodiment is described as an example of the technique in the present disclosure. However, the technique in the present disclosure is not limited to this, and can also be applied to embodiments in which changes, substitutions, additions, omissions, and the like are made as appropriate.

Thus, in the following, other embodiments will be described.

In the above embodiment, the reinforcing core member 430, which has a flat loop-shape and is formed of one metal wire so as to include straight portions 430a and 430b, is exemplified as a reinforcing core member inside the handle 400. However, the reinforcing core member does not need to be a flat loop-shaped structure formed of a single wire. For example, the reinforcing core member may be a cloth-like member formed in a mesh shape with a metal wire, a carbon fiber, or the like as long as the tensile strength can be sufficiently secured.

In the above embodiment, a case where the first unit 100 and the second unit 200 are configured to be detachable via the holder 300 (connecting portion) is described. However, the present disclosure is also applicable to a general notebook-type electronic apparatus 1' in which the first unit 100 and the second unit 200 are not detachable.

That is, with reference to FIG. 11, the electronic apparatus 1' according to the second aspect of the present disclosure includes:

a first unit 100 including an operation unit; and
a second unit 200 which is rotatably connected to the first unit 100 and includes a display unit.

The second unit 200 includes a holding portion 400 in a side portion connected to the first unit 100, the holding portion 400 being used by a user when the user holds the electronic apparatus 1'.

The holding portion 400 is arranged to be positioned behind the first unit 100 in the closed state where the second unit 200 is closed with respect to the first unit 100, and positioned below a lower surface of the first unit 100 in an open state where the second unit 200 is opened with respect to the first unit 100.

In addition, in this case, the holding portion has s strap-like shape and is configured to be capable of being stored in a side portion connected to the first unit.

As described above, the embodiment is described as an example of the technique in the present disclosure. To this end, the accompanying drawings and detailed description are provided.

Therefore, among the components described in the accompanying drawings and the detailed description, not only the components essential for solving the problem, but also the component not essential for solving the problem may be included in order to exemplify the above technique. Therefore, it should not be recognized that these non-essential components are essential immediately because these non-essential components are described in the accompanying drawings and the detailed description.

In addition, since the above embodiment is for illustrating the technique in the present disclosure, various changes, substitutions, additions, omissions, and the like can be made within the scope of the claims or the equivalent thereof.

The present disclosure can be widely used in the electronic apparatus including the first unit and the second unit.

What is claimed is:

1. An electronic apparatus comprising:
a first unit including an operation unit;
a second unit including a display unit; and
a connecting portion which is rotatably coupled to the first unit and to which the second unit is detachably connected,
wherein the connecting portion includes a holding portion which is used by a user when the user holds the electronic apparatus, the holding portion including:
a body portion which is used by the user for holding the electronic apparatus, and
reinforced portions extending from respective end portions of the body portion in the longitudinal direction of the body portion,
wherein the connecting portion further includes mounting portions which store the reinforced portions, respectively, so that the reinforced portions are mounted slidably in the longitudinal direction of the body portion,
wherein the holding portion is arranged to be positioned behind the first unit in a closed state in which the second unit is closed with respect to the first unit, and positioned below a lower surface of the first unit in an open state in which the second unit is opened with respect to the first unit, and
wherein when the body portion is held by the user for holding the electronic apparatus, the reinforced portions slide in the longitudinal direction of the body portion and are pulled out from the mounting portions.

2. The electronic apparatus according to claim 1, wherein the holding portion has a strap-like shape.

3. The electronic apparatus according to claim 1, wherein the second unit has larger weight than the first unit, the electronic apparatus further comprising:
a stand which is rotatable around a rotation axis parallel to a rotation axis of the connecting portion, the stand extending from the connecting portion behind the display unit of the second unit in a state where the second unit is opened with respect to the first unit.

4. The electronic apparatus according to claim 1, wherein the first unit is provided with a protruding portion which protrudes from at least a part around the operation unit, and
when the second unit is closed with respect to the first unit by the connecting portion, the protruding portion and the second unit contact each other and a gap is formed between the first unit and the second unit except in a part in which the protruding portion and the second unit contact each other.

5. The electronic apparatus according to claim 1, wherein a reinforcing core member is arranged inside the reinforced portion.

6. The electronic apparatus according to claim 5, wherein the reinforcing core member is a metal wire.

7. An electronic apparatus comprising:
a first unit including an operation unit; and
a second unit which is rotatably connected to the first unit and includes a display unit,
wherein the second unit includes a holding portion in a side portion connected to the first unit, the holding portion being used by a user when the user holds the electronic apparatus, the holding portion including:
a body portion which is used by the user for holding the electronic apparatus, and
reinforced portions extending from respective end portions of the body
portion in the longitudinal direction of the body portion,
wherein the second unit further includes mounting portions which store the reinforced portions respectively, so that the reinforced portions are mounted slidably in the longitudinal direction of the body portion,
wherein the holding portion is arranged to be positioned behind the first unit in a closed state in which the second unit is closed with respect to the first unit, and positioned below a lower surface of the first unit in an open state in which the second unit is opened with respect to the first unit, and
wherein when the body portion is held by the user for holding the electronic apparatus, the reinforced portions slide in the longitudinal direction of the body portion and are pulled out from the mounting portions.

8. The electronic apparatus according to claim 7, wherein the holding portion has a strap-like shape.

9. The electronic apparatus according to claim 7, wherein the second unit has larger weight than the first unit, the electronic apparatus further comprising:
a stand which is rotatable around a rotation axis parallel to a rotation axis of the second unit, the stand extending from the second unit behind the display unit of the second unit in a state where the second unit is opened with respect to the first unit.

10. The electronic apparatus according to claim 7, wherein
the first unit is provided with a protruding portion which protrudes from at least a part around the operation unit, and
when the second unit is closed with respect to the first unit, the protruding portion and the second unit contact each other and a gap is formed between the first unit and the second unit except in a part in which the protruding portion and the second unit contact each other.

11. The electronic apparatus according to claim 7, wherein a reinforcing core member is arranged inside the reinforced portion.

12. The electronic apparatus according to claim 11, wherein the reinforcing core member is a metal wire.

* * * * *